United States Patent [19]

Schuette

[11] Patent Number: 5,639,991
[45] Date of Patent: Jun. 17, 1997

[54] UTILITY BOX INSERT

[76] Inventor: Gail D. Schuette, 11623 Co. Rd. 13 SE., Watertown, Minn. 55388

[21] Appl. No.: 395,710

[22] Filed: Feb. 28, 1995

[51] Int. Cl.$^6$ .......................... H01H 9/02; H01R 13/506
[52] U.S. Cl. .......................... 174/58; 220/3.8; 33/528; 33/DIG. 10
[58] Field of Search .................. 174/48, 50, 53, 174/58, 66, 67; 220/3.8, 241, 242; 33/528, DIG. 10

[56] References Cited

U.S. PATENT DOCUMENTS

| D. 261,135 | 10/1981 | Home | D13/30 |
|---|---|---|---|
| 946,646 | 1/1910 | Pratt | 220/3.8 |
| 1,540,330 | 6/1925 | Hartmann | 174/58 X |
| 2,630,477 | 6/1950 | Rypinski | 175/308 |
| 2,788,151 | 4/1957 | Shore | 33/528 X |
| 2,987,909 | 9/1958 | Shlank | 70/168 |
| 3,601,276 | 8/1971 | Culpepper | 220/3.8 X |
| 3,745,664 | 7/1973 | Altseimer | 33/DIG. 10 X |
| 4,059,905 | 11/1977 | Wieting | 33/DIG. 10 X |
| 4,907,711 | 3/1990 | Stuchlik, III | 220/3.8 |
| 4,979,633 | 12/1990 | Lakey | 220/3.8 |
| 5,301,437 | 4/1994 | Burke | 33/562 |

*Primary Examiner*—Kristine L. Kincaid
*Assistant Examiner*—Dean A. Reichard
*Attorney, Agent, or Firm*—Westman, Champlin & Kelly, P.A.

[57] ABSTRACT

A protective insert for protecting wires and other contents of a utility box such as an electrical or communication wiring box, from damage during construction, particularly when cutting openings for such boxes in wallboard that has been placed onto studs. The insert is made to utilize the only standard dimensions in utility boxes, namely, the distance between the threaded bores used for fastening switches, receptacles or other fixtures. The protective insert is easily placed into utility boxes using two ribbed posts or shanks that fit into the openings of the box with a fit that retains the insert in place. The insert is easily removed, and it also protects the threaded bores in the box that are used for supporting switches, receptacles, light fixtures, or the like.

8 Claims, 3 Drawing Sheets

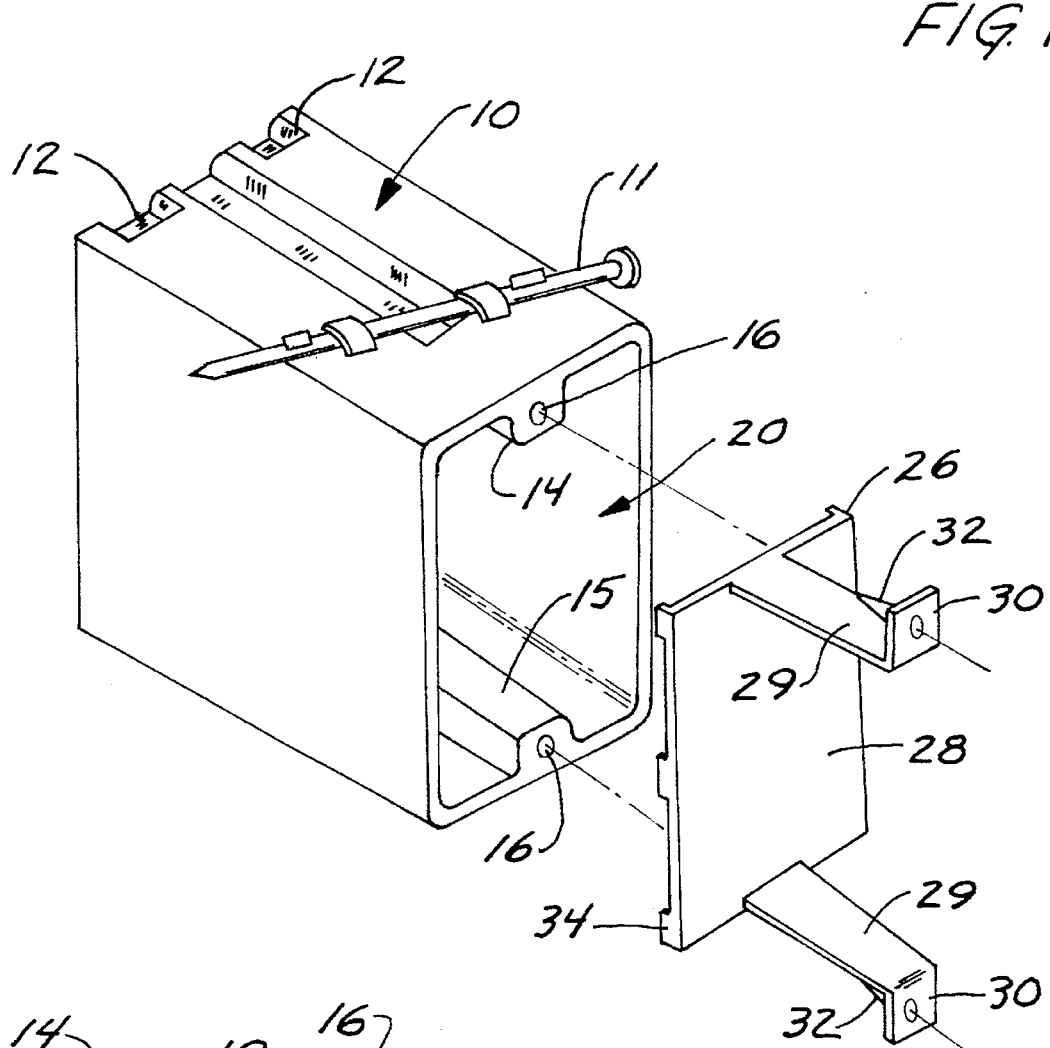
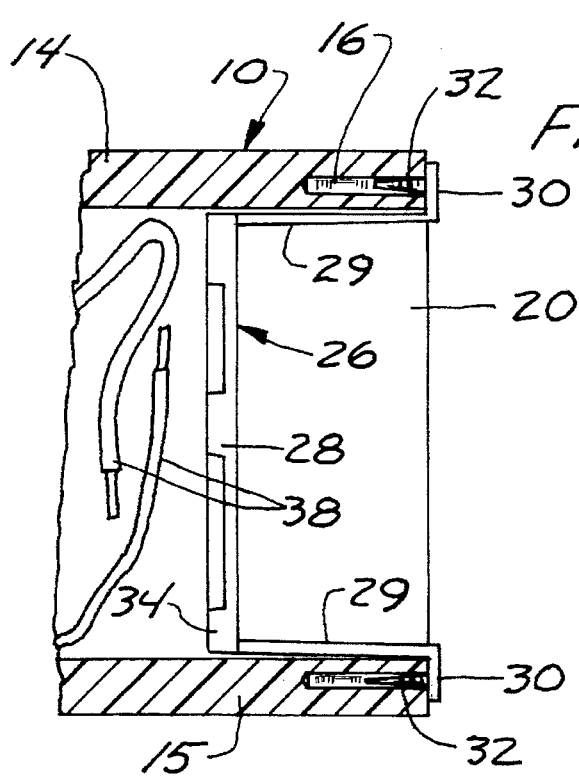

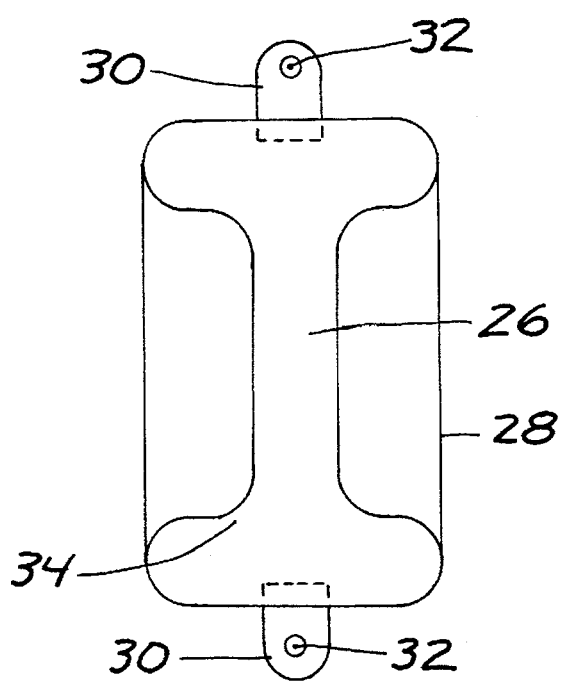
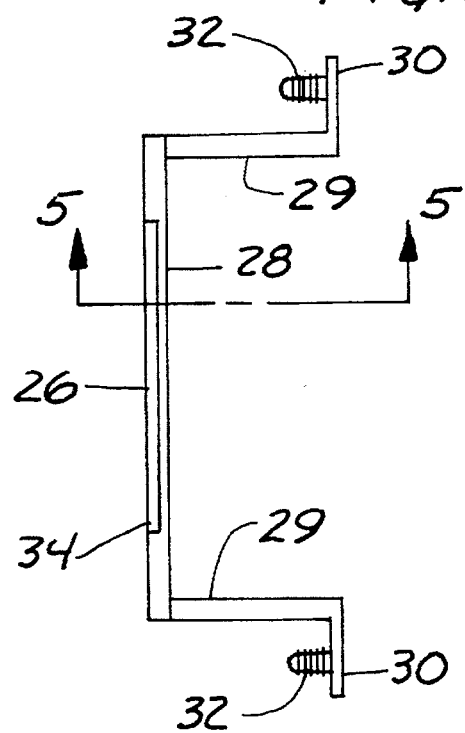
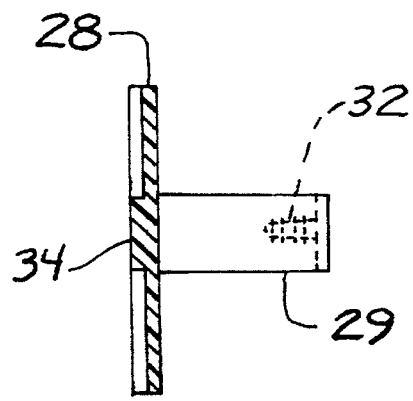

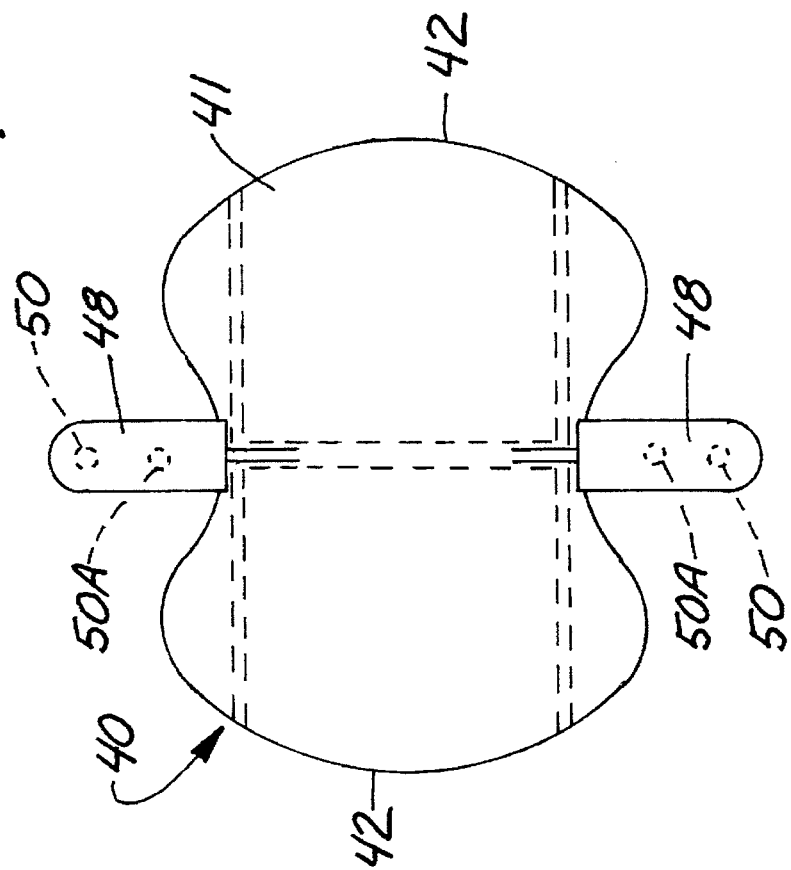
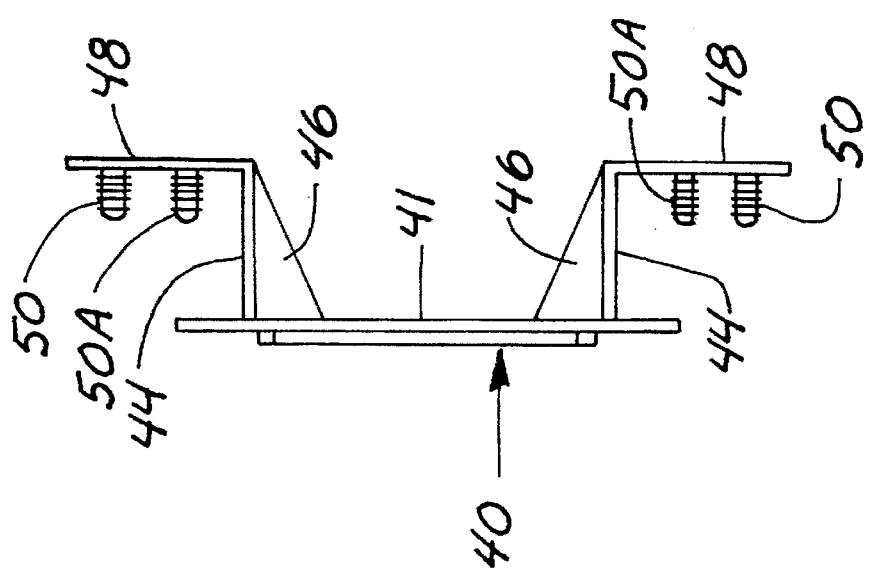

UTILITY BOX INSERT

BACKGROUND OF THE INVENTION

The present invention is an insert for a utility box to protect exposed wires or other components from damage when openings are cut through wallboard in building construction after the rough-in work has been completed.

It is the practice to cut openings for communication and electrical utility boxes, fixtures and the like through the wallboard after the wallboard has been installed on studs. The boxes are put into place on the bare studs, and rough-in electrical work is done before the wallboard is secured in place. U.S. Pat. No. 5,301,437 shows a utility box insert to protect such rough-in work that has clips that are clipped on the side walls of the utility box. The problem is that utility boxes vary in size and can have many different thickness of the walls.

One standard dimension in utility boxes is the spacing between the attachment screw openings used for mounting switches receptacles or fixtures. The present invention is a protective insert that includes a protective plate but which installs into the standard spaced screw threaded openings of a utility box.

SUMMARY OF THE INVENTION

The present invention relates to a protective insert for a utility box that includes a plate to guard contents of the box, such as exposed ends of electrical or communication wires or the like, from both damage from sheetrock routers, or the like, when openings are cut into wallboard for the box, and also the protective insert prevents excessive joint compound from solidifying in the deep recesses and screw holes of the box.

The present invention comprises a plate, with support arms that carry ribbed shanks similar to a screw shank, that frictionally or interference fit into the screw holes of a utility box. The form shown has two arms with end tabs that carry the shanks that are spaced apart a distance equal to the spacing of the attachment screw holes for switches, outlets, and for fixtures. In this manner, regardless of the box size or wall thickness, the protective inserts can be put into place easily and simply. The protective plate can be made of a size so that it will fit in boxes if the screw openings are on the exterior of the box or as shown herein on the interior of the box.

The protective insert can be manufactured from plastic material so it is low cost and electrically insulating. It can be made in various shapes and designs, but by utilizing attachment shanks at the standard spacing between the screw openings for attaching components into electrical boxes it is assured that mounting is easily done. It should be noted that ceiling boxes presently have two different standard screw spacings. Thus the standard lengths would be utilized for ceiling boxes, but there would be two sets of shanks and one set or the other would be clipped off as needed.

BRIEF DESCRIPTION OF THE DRAWINGS

FIG. 1 is a perspective view of a typical electrical box made out of plastic and shown with a box protector insert made according to the present invention positioned for insertion;

FIG. 2 is a fragmentary vertical sectional view through the box of FIG. 1 with the protective insert in place;

FIG. 3 is a side elevational view of a protective insert made according to the present invention;

FIG. 4 is the rear view of the insert of FIG. 3;

FIG. 5 is a sectional view as on line 5—5 in FIG. 3;

FIG. 6 is a front view of a modified shape insert for use with a ceiling box; and FIG. 7 is a side view of FIG. 6 as viewed from the left-hand side thereof.

DETAILED DESCRIPTION OF THE PREFERRED EMBODIMENTS

As shown in FIG. 1, a utility box indicated at 10 is made of a plastic material, and has a fastening nail 11 at the upper end thereof, in a normal manner. Suitable knockouts indicated at 12 for permitting electrical wires to be inserted are provided at the rear of the box, and in this form of the box, a pair of longitudinal extending ribs 14 and 15, at the top and bottom of the box, respectively, are provided on the box interior. The ribs 14 and 15 have threaded apertures 16 facing outwardly from the box. The apertures are spaced apart a standard distance to receive switches, electrical outlets, or similar box mounted electrical components. The apertures also can receive telephone and digital communication connectors.

When being installed in a home, utility boxes are attached to a wall stud, and then wallboard is placed over the entire wall, including over the box opening indicated generally at 20.

Then since the boxes are roughed-in or wired, before installation of wallboard, electrical wires coming through the knockouts 12 will have terminal ends on the inside of the box. These ends are generally bent and folded back toward the back wall of the box, but often times the wires will be springing or extending forwardly near the openings 20. When a carpenter cuts the wallboard away for the box opening the wires are subject to damage. Also in finishing Gypsum wallboard, joint compound can get into the box and solidify, causing problems in clean up and installation of components such as switches or receptacles.

Electrical utility boxes can vary in outside shape, wall thickness and outside dimensions. However, spacing between the screw holes 16,16 is a standardized spacing, so manufacturers of switches, outlets and other components can be assured their product can be installed in the boxes. Even if the box is made of metal and has ears projecting above and below the ends, as opposed to a molded plastic box as shown where bosses 15 and 14 are formed in the inside of the box, the spacing between the centerlines of the holes 16 remains the same.

The present protective insert illustrated generally at 26 is adapted to protect the interior of the electrical box 10, particularly the rear portions thereof. The protective insert 26 protects any electrical wires that have been inserted into the box in the rear portions. The protective insert will protect the wires from power sheetrock routers, knives or saws used to cut an opening in wallboard for access to the box after the box has been installed and the wallboard placed over the box.

The protective insert 26 comprises a plate member 28, which has a pair of parallel support arms 29, 29 on at each of the ends of the plate. The support arms 29 extend outwardly from one face of the plate 28 and have tabs 30 attached thereto. The upper support arm 29 has an upwardly extending tab 30, and lower support arm 29 has a downwardly extending tab 30. In the form shown, the protective insert 26 is molded and the arms 29 and tabs 30 are integral with the plate. Each of the tabs 30 includes a molded in post or shank 32 that has external ribs as shown, and thus an irregular outer surface.

The plate 28, when made of a molded plastic, has reinforcing ribs 34 on the backside thereof. This is shown in FIG. 4, as an I-shaped rib section including a vertical rib in the center of the plate.

After an electrician or telephone or data communication technician has mounted a box (called a utility box) in place and has roughed in the wiring, the protective insert 26 is slid into place through the open face 20 of the box (the box is uncovered at that stage of new construction) and the stems or shanks 32 are slid into the holes 16. The ribs on stems or shanks 32 fit with a friction fit. The ribs or other roughening irregularity on the exterior surface of the shanks tend to grip on the threads on the interior of the holes 16. The holes 16 are threaded to receive the standard screws for supporting a switch, outlet or the like.

The one piece molded construction of the protective insert 26 permits the plate 28 to be easily slid into place, between the ribs 15 and 14. The posts or shanks 32 hold the protective insert 26 and particularly the plate 28 oriented properly and in position for protecting any wires 38 (FIG. 2) or other component that were inside the box if the opening in the covering wallboard is cut with a power sheetrock router, saw or knife. The preferred plastic material is an electrical insulator so if the wiring is accidentally carrying voltage, touching the insert will not be a disaster.

FIGS. 6 and 7 illustrate a modified protective insert 40 that has a protective plate 41 that is formed with a generally circular edge 42 fit into a round (ceiling fixture) box. The plate 41 has a pair of support arms 44 extending rearwardly therefrom. The arms 44 are supported with a gusset 46 back to the plate 41. The plate 41 also can have reinforcing ribs shown at 46 thereon for reinforcing the plate where desired. The support arms 44 have elongated tabs 48, which are braced back to the arms 44 with gussets 46. The tabs 48 have on set of ribbed posts or shanks 50 formed thereon and extending rearwardly, or back toward the plate and thus to the interior of a box in which the unit 40 is to be placed. A second set of posts or shanks 50 also is provided for the second standard spacing of ceiling boxes. This form of the invention is to show that different configurations of arms can be utilized, and the outside shape of the plate used can be adjusted to suit existing boxes.

Double boxes can be protected by having a doublewide plate that fits into the double box. There are two standard spacings for the attachment screw openings in round boxes, so that there are two shanks 50 and 50A on each tab 48. One set is clipped off before use. This modification is used only with the form of the invention shown in FIGS. 6 and 7. For example, the posts or shanks 50A will be clipped off for one size box and the posts or shanks 50 clipped of for the other size box.

The protective inserts of the present invention are used in connection with boxes that are spaced apart a standard amount for mounting components, such as terminals, connectors, switches, outlets, jacks and the like. Inserting the posts or shanks 32 into the threaded bores protects the threads from filling with wall joint compound and from other damage as well.

The projections on shanks are designed to provide a retaining force merely by pushing them into the aligning holes. Small ridges, bumps or just friction fit surfaces will work for retaining.

Although the present invention has been described with reference to preferred embodiments, workers skilled in the art will recognize that changes may be made in form and detail without departing from the spirit and scope of the invention.

What is claimed is:

1. A protective insert for blocking an interior chamber of a utility box having a pair of threaded openings for receiving screws for supporting a component in the box, the protective insert comprising a plate dimensioned to fit within the interior chamber of the utility box, and at least one arm on said plate extending from the plane of the plate, said at least one arm having a tab at an outer end thereof to extend in a direction to overlie at least one of the threaded openings, and a shank member attached to the tab and extending back toward the plate, said shank member being of a size to slip into one of the threaded openings and having annular ribs thereon engaging and providing an interference fit with the threads in said one of the threaded opening for retaining the plate in the interior chamber of the box.

2. The protective insert of claim 1, wherein said insert comprises a plastic material and wherein the arm and the plate are integrally formed.

3. The protective insert of claim 1, wherein there are two substantially identical arms, tabs and shank members at opposite ends of the plate forming the sole support for the plate in the interior chamber of the utility box.

4. A protective insert for blocking an opening to an interior chamber of a utility box, said utility box having at least a pair of spaced threaded bores adjacent the opening for receiving screws for supporting a component in the box, the protective insert comprising a plate dimensioned to fit within the interior chamber of the utility box, and a pair of arms on said plate extending from the plane of the plate, said arms being spaced apart, the arms each having an outer end spaced from the plate and each arm being configured to support a separate shank member, the shank members having ends extending back toward the plate, said shank members being spaced substantially at the spacing of the threaded bores and being of a size to retainingly fit into the threaded bores for supporting and retaining the plate in the interior chamber of the box and spaced inwardly from the opening of the utility box.

5. The protective insert of claim 4, wherein said shank members have annular ribs thereon to provide an interference fit with threads on the interior of the threaded bores.

6. The protective insert of claim 4, wherein the threaded bores are formed adjacent opposite end walls of the utility box, and wherein the arms have tabs that overlie the bores when the plate is inserted into the utility box, the shank members being mounted on the tabs.

7. The protective insert of claim 6, wherein said insert is a molded material and wherein the pair of arms and the plate are integrally formed.

8. The protective insert of claim 7, wherein the arms, tabs and shank members form the sole support for the insert plate in the interior chamber of the utility box.

* * * * *